United States Patent [19]

Elango

[11] Patent Number: 5,644,484
[45] Date of Patent: Jul. 1, 1997

[54] BIDIRECTIONAL LOAD CURRENT SENSE CIRCUIT FOR A H-BRIDGE

[75] Inventor: PakriSwami Elango, Singapore, Singapore

[73] Assignee: SGS-Thomson Microelectronics Pte Ltd., Singapore and Seoul, Rep. of Korea

[21] Appl. No.: 501,881

[22] Filed: Jul. 13, 1995

[30] Foreign Application Priority Data

Jul. 19, 1994 [EP] European Pat. Off. .............. 94410051

[51] Int. Cl.[6] .................................................. H02M 3/335
[52] U.S. Cl. ........................................... 363/98; 363/132
[58] Field of Search ............................ 363/95, 98, 124, 363/132, 56; 318/287, 291; 307/494; 323/315; 330/253

[56] References Cited

U.S. PATENT DOCUMENTS

| | | | |
|---|---|---|---|
| 4,581,565 | 4/1986 | Van Pelt et al. | 318/294 |
| 4,845,417 | 7/1989 | Ohkubo et al. | 318/696 |
| 4,939,600 | 7/1990 | Desai et al. | 360/78.04 |
| 5,032,745 | 7/1991 | Izadinia et al. | 307/571 |
| 5,062,023 | 10/1991 | Squire | 360/78.04 |
| 5,079,924 | 1/1992 | van der Broeck et al. | 62/6 |
| 5,111,378 | 5/1992 | Nowak et al. | 363/98 |
| 5,126,603 | 6/1992 | Jattori | 307/571 |
| 5,210,475 | 5/1993 | Juzswik et al. | 318/293 |
| 5,463,347 | 10/1995 | Jones et al. | 330/253 |
| 5,495,155 | 2/1996 | Juzswik et al. | 318/293 |

OTHER PUBLICATIONS

IBM Technical Disclosure Bulletin, vol. 32, No. 5B, Oct. 1989, New York, US pp. 320–321, "Reduced Current Sense Offset Errors in A Motor Power Driver".

Primary Examiner—Edward Tso
Assistant Examiner—Adolf Berhane
Attorney, Agent, or Firm—Wolf, Greenfield & Sacks, P.C.; James H. Morris; Brett N. Dorny

[57] ABSTRACT

The present invention relates to a current sense device for a load arranged in a diagonal of a H-bridge comprising MOS transistors (M1, M2, M3, M4) and operating in class AB, characterized in that it includes sensor, independent from the H-bridge, for measuring the current flowing in the load. A current-voltage converter converts the current measured by said sensor into a voltage proportional to said current. The voltage is applied to a sense amplifier that determines the transconductance gain of a control amplifier of the transistors of the H-bridge.

24 Claims, 5 Drawing Sheets

BIDIRECTIONAL LOAD CURRENT SENSE CIRCUIT FOR A H-BRIDGE

BACKGROUND OF THE INVENTION

1. Field of the Invention

The present invention relates to a device for sensing the load current for a control circuit of a H-bridge comprising MOS transistors and operating in class AB.

It applies for example to a control circuit of a voice coil used for positioning the actuator or the read/write heads of a control circuit of a disk on a desired track. The position of the heads is controlled through the current in the coil. The control of the movable coil uses a transconductance amplifier wherein the output current is proportional to the input voltage. Therefore, it is necessary to know the direction and the magnitude of the load current. The transconductance amplifier or control amplifier operates on the coil through a H-bridge, the coil being arranged in a diagonal of the bridge.

2. Discussion of the Related Art

Conventionally, in such a control circuit of a movable coil, the transconductance loop is closed through a sensing resistor serially connected with the load.

Figure 1:
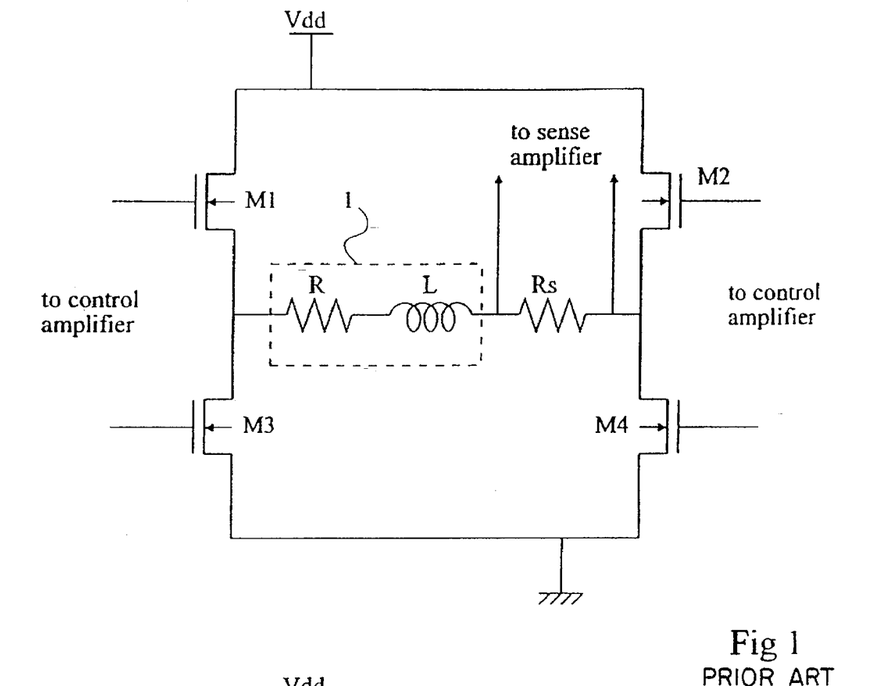
FIGS. 1–3, above-disclosed, illustrate schematically conventional H-bridge and current sense arrangements.

FIG. 1 shows a first example of a conventional circuit. The illustrated H-bridge includes four N-channel MOS transistors connected between a supply voltage Vdd and ground. The bridge is controlled by a control amplifier (not shown) connected to the gates of the four transistors. The drains of the two first transistors M1, M2, or high-side transistors, are connected to the supply voltage Vdd. Their respective sources are connected to the drains of two other transistors M3, M4, or low-side transistors, whose sources are grounded. The source of the first high-side transistor M1 is connected to a first terminal of a load 1 while the second terminal of the load 1 is connected through a sense resistor Rs to the source of the second high-side transistor M2. The two terminals of resistor Rs are connected to a sense amplifier (not shown) that transmits the voltage across resistor Rs to the control amplifier for controlling its gain. The load 1 corresponds for example to a resistor R serially connected with an inductor L.

Figure 2:
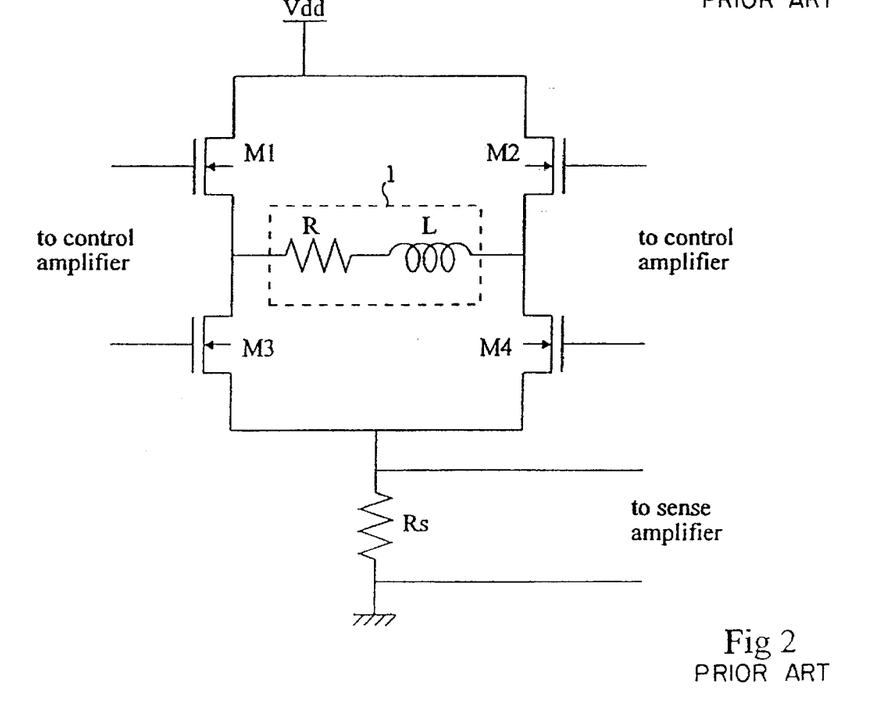

FIG. 2 shows a second conventional control circuit of a moving coil. The difference with the circuit of FIG. 1 is that the load current sense resistor Rs is connected between the common sources of the two low-side transistors M3, M4 and ground. The terminals of resistor Rs are still connected to a sense amplifier.

In both circuits, the load current flows in the sense resistor Rs wherein a relatively high power dissipation occurs. Additionally, this causes a limitation of the load current for a given supply voltage Vdd.

Figure 3:
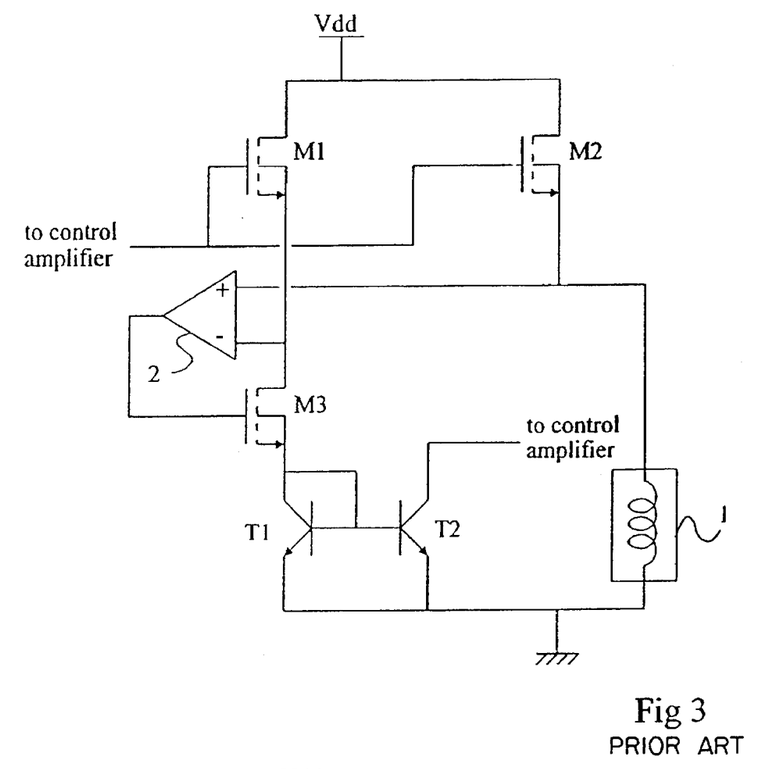

A third conventional circuit is shown in FIG. 3. It includes three MOS transistors M1, M2, M3, an operational amplifier 2 and two mirror-connected NPN transistors T1, T2. Two high-side transistors M1, M2 have their respective drains connected to the supply voltage Vdd and their gates connected to a first terminal of the control amplifier. The source of transistor M1 is connected to the inverting input of the operational amplifier 2 and to the source of the low-side transistor M3. The output of the operational amplifier 2 is connected to the gate of transistor M3 whose source is connected to the collector of a first bipolar transistor T1. The two transistors T1, T2 have their bases connected with the collector of transistor T1 and their emitters grounded. The collector of transistor T2 is connected to the second terminal of the control amplifier. The non-inverting input of the operational amplifier 2 is connected to the source of the high-side transistor M2 and to a first terminal of load 1. The second terminal of load 1 is grounded. Such a circuit limits the power dissipated in as much as no serial resistor is used for sensing the load current. However, this circuit is operative only for class A control circuits where the current of the high-side power transistor M2 always flows in the load 1. Such a circuit cannot be used when the output is operated in class AB where the load current is different from the current flowing through the power transistor.

An object of the present invention is to avoid the above drawbacks of the existing sense circuits and to provide a load current sense circuit operable in class AB with a low dissipated power.

SUMMARY OF THE INVENTION

To attain this object, the present invention provides a current sense device for a load arranged in a diagonal of a H-bridge comprising MOS transistors and operating in class AB, comprising first means, independent from the H-bridge, for measuring the current flowing in the load.

According to an embodiment of the invention, the current sense device includes a current-voltage converter for converting the current measured by a sensor into a voltage proportional to the current. This voltage is applied to a sense amplifier that determines the transconductance gain of a control amplifier of the transistors of the H-bridge.

According to an embodiment of the invention, the current sense device further includes a proportionally device for maintaining the voltage linearly proportional to the current flowing in the load, by making said voltage independent from the current in the two high-side transistors of the H-bridge.

According to an embodiment of the invention, the sensor includes current mirrors for reproducing the currents flowing in the two low-side transistors of the H-bridge.

According to an embodiment of the invention, the current-voltage converter includes an operational amplifier whose inputs are connected to the terminals of a resistor arranged in a diagonal of an auxiliary bridge having MOS transistors. The currents reproduced by the current mirrors constitute the control signals of the auxiliary bridge.

According to an embodiment of the invention, the proportionally device includes two current comparators. Each comparator receives one of the currents reproduced by the current mirrors and a biasing current. Each comparator provides a current representing the difference between the biasing current and one of the currents reproduced by the mirrors; if it is positive, the result of the comparison and its inverted value are reproduced at the terminals of the resistor of the auxiliary bridge.

According to an embodiment of the invention, each of the current mirrors includes a MOS transistor, whose source is grounded, whose gate is connected to the gate of one of the low-side transistors of the H-bridge, and whose drain constitutes one of the terminals of the transconductance control amplifier.

According to an embodiment of the invention, the value of the resistor of the current-voltage converter determines, through the sense amplifier, the transconductance gain of the control amplifier of the H-bridge.

According to an embodiment of the invention, the load includes a moving coil for positioning the read/write head of a hard disk.

The provision of a device independent from the H-bridge for sensing the load current reduces the power dissipated in the bridge. This power corresponds only to the power dissipated in the load. Additionally, as no current is absorbed in the bridge for sensing the current, the maximum operational current of the bridge is higher.

Indeed, in all the prior art circuits, the current sense depends upon the H-bridge. In the case of the circuit of FIG. 2, the sense resistor Rs shifts the voltage of the sources of the low-side transistors of the bridge. The circuit of FIG. 3 cannot operate in class AB and the bipolar transistors have an effect on the bridge.

The use of MOS transistors for making current mirrors is motivated by the fact that those transistors are voltage-controlled whereby the mirror ratio is optimum.

Comparing the currents reproduced by the mirrors to a biasing current additionally improves the control of the H-bridge by suppressing the errors due to the operation in class AB which could cause the current-voltage characteristic of the converter to be non linear, in particular for low load currents.

The use, inside the current-voltage converter, of an auxiliary bridge of MOS transistors enables an easy arrangement for determining the transconductance gain of the control amplifier.

BRIEF DESCRIPTION OF THE DRAWINGS

Those objects, features and advantages, and others, of the present invention will be explained in more detail in the following description of specific embodiments made, in a non-limitative way, in connection with the attached drawings wherein.

DETAILED DESCRIPTION

Figure 4:
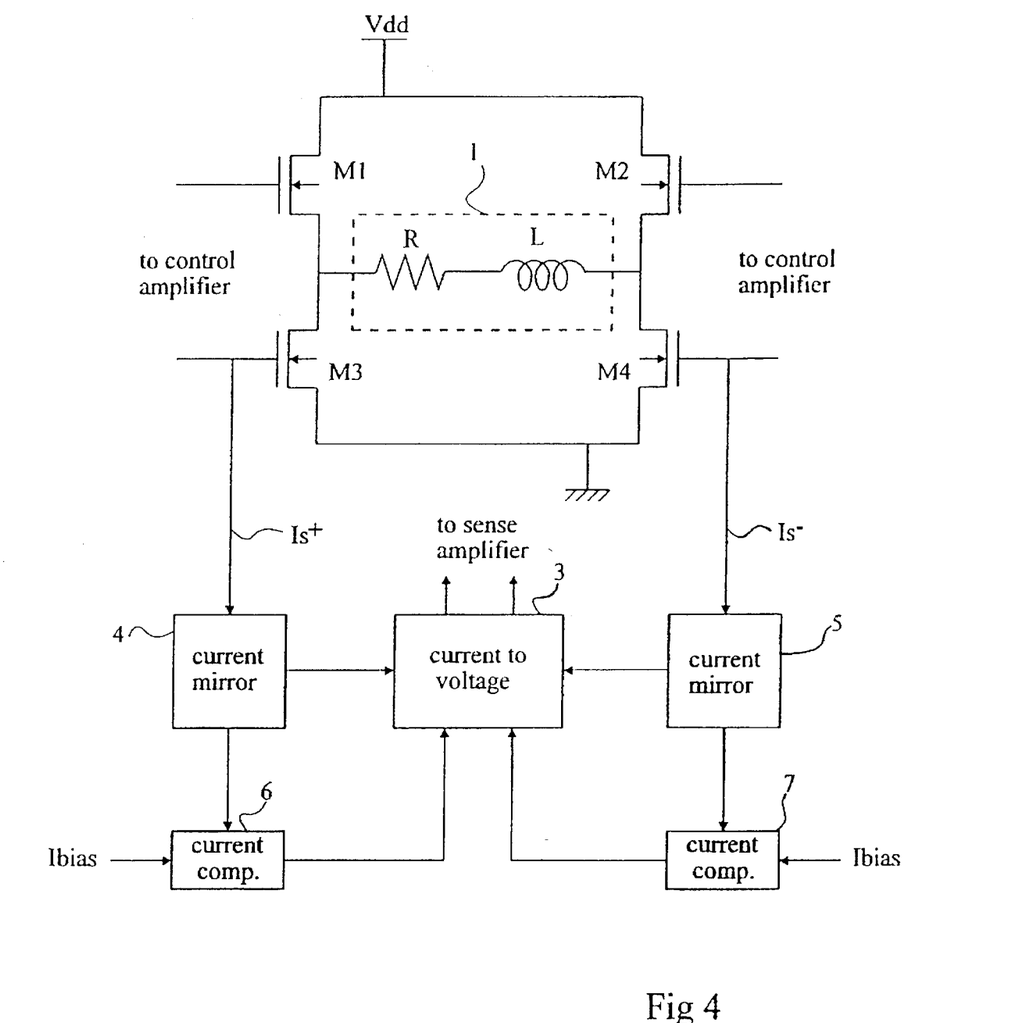
FIG. 4 is a schematical block diagram of an embodiment of a sensing device according to the present invention.

As shown in FIG. 4, the H-bridge includes, like in FIG. 2, four N-channel MOS transistors M1, M2, M3, M4. The respective drains of the first two, high-side, transistors M1, M2 are connected to a supply voltage Vdd. The respective sources are connected to the drains of two low-side transistors M3, M4 whose sources are grounded. A load 1 is connected between the sources of transistors M1, M2. The gates of transistors M1, M2, M3, M4 are connected to a transconductance control amplifier (not shown). The gates of the low-side transistors M3, M4 additionally constitute two input terminals (Is+, Is−) of the sense circuit according to the invention.

The sense circuit according to the present invention includes a current-voltage converter 3, two current mirrors 4, 5 and two current comparators 6, 7.

Each current mirror 4, 5 attempts to reproduce the current flowing in one of the lower transistors M3, M4 so that the difference between the two currents can be converted into a voltage by the current-voltage converter 3. This difference is sent, as a voltage, by the converter 3 to the sense amplifier that determines the transconductance of the control amplifier. The control amplifier, by acting on the gates of the transistors of the H-bridge, modifies the current in load 1.

Figure 5:
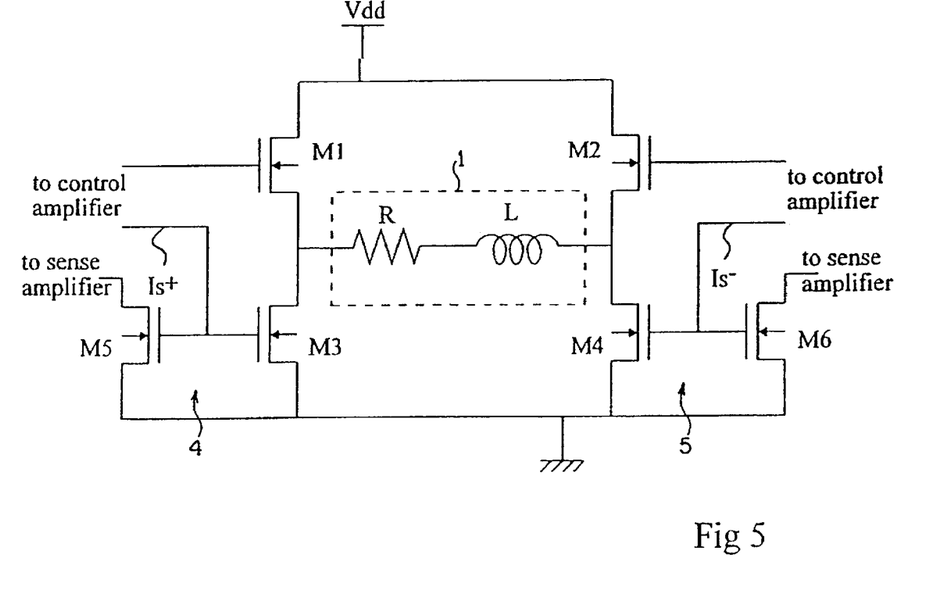
FIG. 5 shows an embodiment of the current mirrors of the device of FIG. 4.

As shown in FIG. 5, each current mirror 4, 5 includes a N-channel MOS transistor M5, M6 whose source is grounded. The gate of each transistor M5, M6 is connected to the gate of the associated transistor M3, M4. The drains of transistors M5, M6 are connected to the sense amplifier (not shown). As the difference between the currents flowing in the low-side transistors M3, M4 corresponds to the current flowing in load 1, the use of the mirrors provides this current without perturbating the circuit. One of the benefits is that the MOS transistors are voltage-controlled. For bipolar transistors, the base current would have an influence on the outputs Is+ and Is−.

The currents flowing in the mirror transistors M5, M6 are respectively proportional to the currents in transistors M3, M4 with a ratio equal to the ratio between the gate widths (W) of two associated transistors. The gate lengths (L) are considered identical for two associated transistors, respectively M3–M5 and M4–M6, and the modulation due to the drain-source voltage of transistors can be neglected. The ratio between the gate lengths of two associated transistors can be easily precisely determined for this type of mirror. When the power MOS transistors are vertical DMOS transistors of a plurality of identical cells, some cells of the power transistor are used for implementing the mirroring transistor. Thus, the channel length of the cells of the mirroring transistor is strictly identical to the channel length of the cells of the power transistor.

The reason the modulation due to the drain-source voltage of transistors can be neglected is that the polarization voltage of the transistors operating in class AB is generally fixed so that the output voltage of the bridge is about half of the supply voltage Vdd. Therefore, with a low load current, the output voltage varies within a small range with respect to its initial value.

Figure 6:
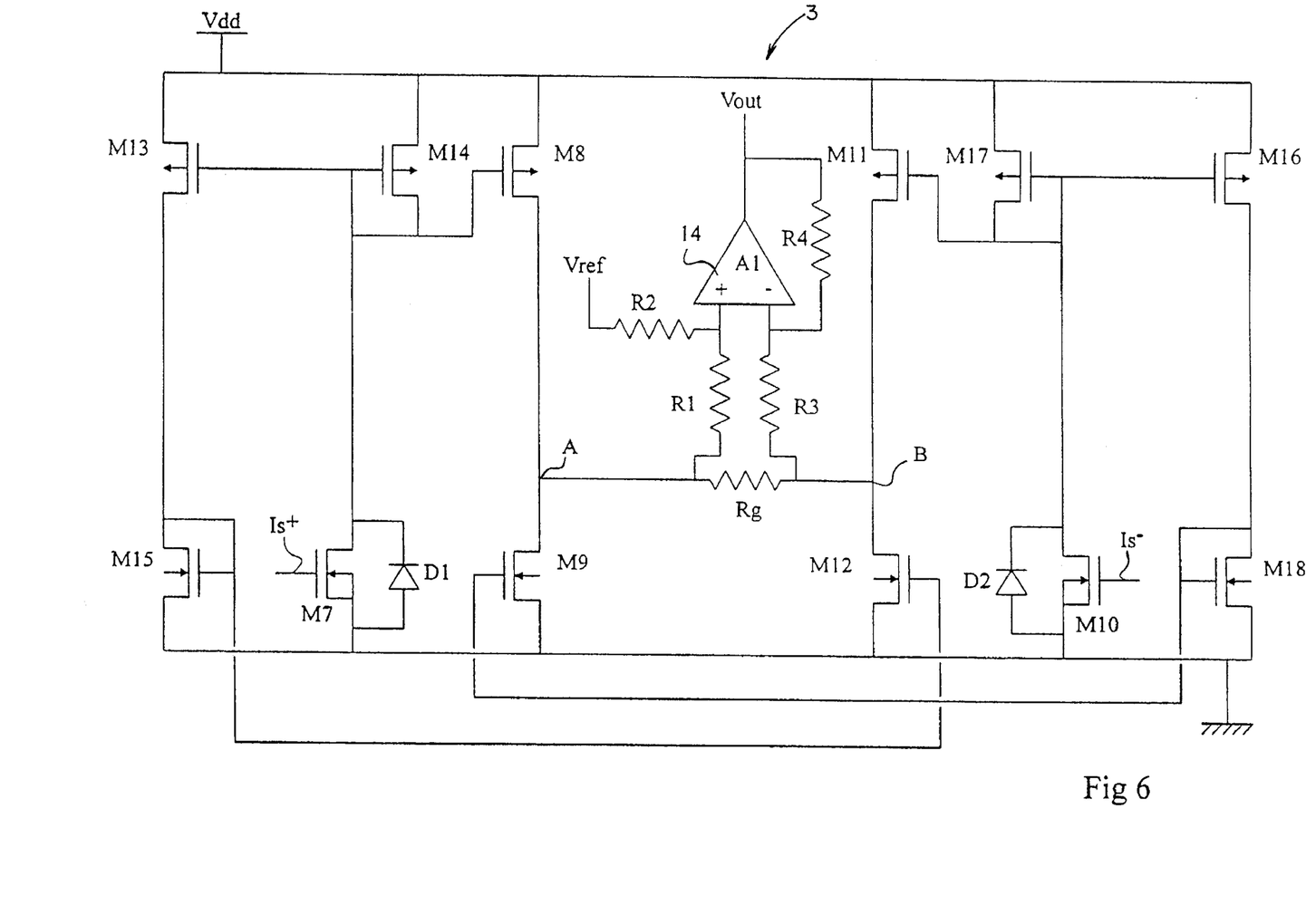
FIG. 6 shows an embodiment of a currant-voltage converter of the device of FIG. 4.

The current-voltage converter 3 is schematically shown in FIG. 6. This converter provides an output voltage Vout that is proportional to the difference between the currents reproduced by the mirroring transistors M5, M6. The voltage Vout is proportional to the current flowing through a resistor Rg. If this current through resistor Rg is proportional to the current in the load 1, the voltage Vout is proportional to the current in the load 1.

The gate of transistor M5 that corresponds to a first input terminal Is+ of the converter 3 is connected to the gate of an enhancement DMOS transistor M7, whose parasitic diode is symbolized by a diode D1. The source of transistor M7 is grounded. The drain of transistor M7 is connected to the gate of a P-channel MOS transistor M8 that constitutes a first high-side transistor of an auxiliary bridge formed around resistor Rg. The drain of transistor M8 is connected to the supply voltage Vdd while its source is connected to the drain of a first low-side N-channel MOS transistor M9. The source of transistor M9 is grounded. The same circuit is reproduced on the side of the second input terminal Is− of the converter 3. The gate of transistor M6 is connected to the gate of an enhancement DMOS transistor M10, its parasitic diode being symbolized by a diode D2, and whose source is grounded. The drain of transistor M10 is connected to the gate of a P-channel MOS transistor M11 that constitutes a second high-side transistor of the auxiliary bridge. The drain of transistor M11 is connected to the supply voltage Vdd while its source is connected to the drain of a second low-side N-channel transistor M12. The source of transistor M12 is grounded.

To reproduce in transistor M8 the current I1 flowing in transistor M5, the gate of transistor M8 is connected to the gate of two mirror-connected P-channel MOS transistors M13, M14. The drains of transistors M13, M14 are connected to the supply voltage Vdd. The transistor M14 is diode-connected, its source being connected to its gate, while the source of transistor M13 is connected to the drain of an N-channel MOS transistor M15, also diode-connected. The source of transistor M15 is grounded while its gate is connected to its drain and to the gate of a second low-side transistor M12 of the auxiliary bridge. The same circuit is implemented to reproduce the current I2 flowing through transistor M6 in transistor M11. The gate of transistor M11 is connected to the gate of two mirror-connected P-channel MOS transistors M16, M17. The drains of transistors M16, M17 are connected to the supply voltage Vdd. Transistor M17 is diode-connected, its gate being connected to its source, while the source of transistor M16 is connected to the drain of a diode-connected N-channel MOS transistor M18. The source of transistor M18 is grounded and its gate is connected to its drain and to the gate of transistor M9.

Resistor Rg is inserted in a diagonal of the bridge and its terminals are respectively connected to the inputs of an operational amplifier 14. This operational amplifier is connected as a current-voltage converter. Its non-inverting input is connected, through a resistor R1, to the source of transistor M8, that is to a terminal A of resistor Rg. This non-inverting input is also connected, through a resistor R2, to a reference voltage Vref. Its inverting input is connected, through a resistor R3, to the source of transistor M11, that is to the second terminal B of resistor Rg. The feed-back loop between the output and the inverting input of the operational amplifier 14 comprises a resistor R4. The output Vout of the operational amplifier 14 varies around the reference voltage Vref.

It will be shown that the amplitude of the variation of Vout with respect to Vref is proportional to the current I flowing in the load 1. The direction of the oscillation corresponds to the direction of the current in load 1.

Indeed, for a given load current I, the difference between the currents flowing in the transistors M3, M4 (FIG. 4) is equal to the value of this load current I. The direction of the current corresponds to the sign of this difference. The difference between currents I1 and I2 flowing in the mirror transistors M5, M6 is proportional to the value of the load current I. The direction of this current always corresponds to the sign of this difference.

If we assume, for example, that all the load current I flows in the transistor M3, that is the current flowing in the transistor M4 is null, the current I1 is I1=W(M5)/W(M3)*I, where W(M5)/W(M3) represents the ratio between the widths (W) of the gates of transistors M5 and M3. As the current I1 is reproduced in transistor M8 and as no current flows in transistors M11 and M9 (I2 being null), the current I1 flows in resistor Rg. So, Vout=W(M5)/W(M3)*I*Rg*Av, where Av is the gain of the operational amplifier 14.

Conversely, if we assume that all the load current I flows in transistor M4, that is the current flowing in transistor M3 is null, I2=W(M6)/W(M4)*I, where W(M6)/W(M4) is the ratio between the widths (W) of the gates of transistors M6 and M4. As the current I1 is reproduced in transistor M11 and as no current flows in the transistors M8 and M12 (I1 being null), the current I2 flows in resistor Rg. The potential across resistor Rg is −I2*Rg and Vout=−W(M6)/W(M4) *I*Rg*Av.

The output voltage Vout varies between these two values as a function of the variations of the load current I. The output voltage Vout is provided to the sense amplifier so that the latter determines a suitable transconductance of the control amplifier. As this voltage is proportional to the value of resistor Rg, resistor Rg is sized so that the sense amplifier can vary the transconductance as desired.

The H-bridge arranged around load 1 is polarized to operate in class AB to avoid distortions in the bridge and transistors M1, M2 are permanently conducting. Accordingly, the current flowing in the low-side transistors M3, M4 corresponds to the sum of the current in load 1 and of the currents in the high-side transistors M2, M1. To avoid that the additional current originating from the high-side transistors M1, M2 causes the voltage across resistor Rg to be non-linear, in particular for low load currents, the currents I1 and I2 are compared to a biasing current Ibias. This comparison is made by comparators 6, 7 (FIG. 4) that compare the currents I1 and I2 with a biasing current Ibias. They provide the difference between the current Ibias and the currents I1 and I2 to the current-voltage converter 3.

Figure 7:
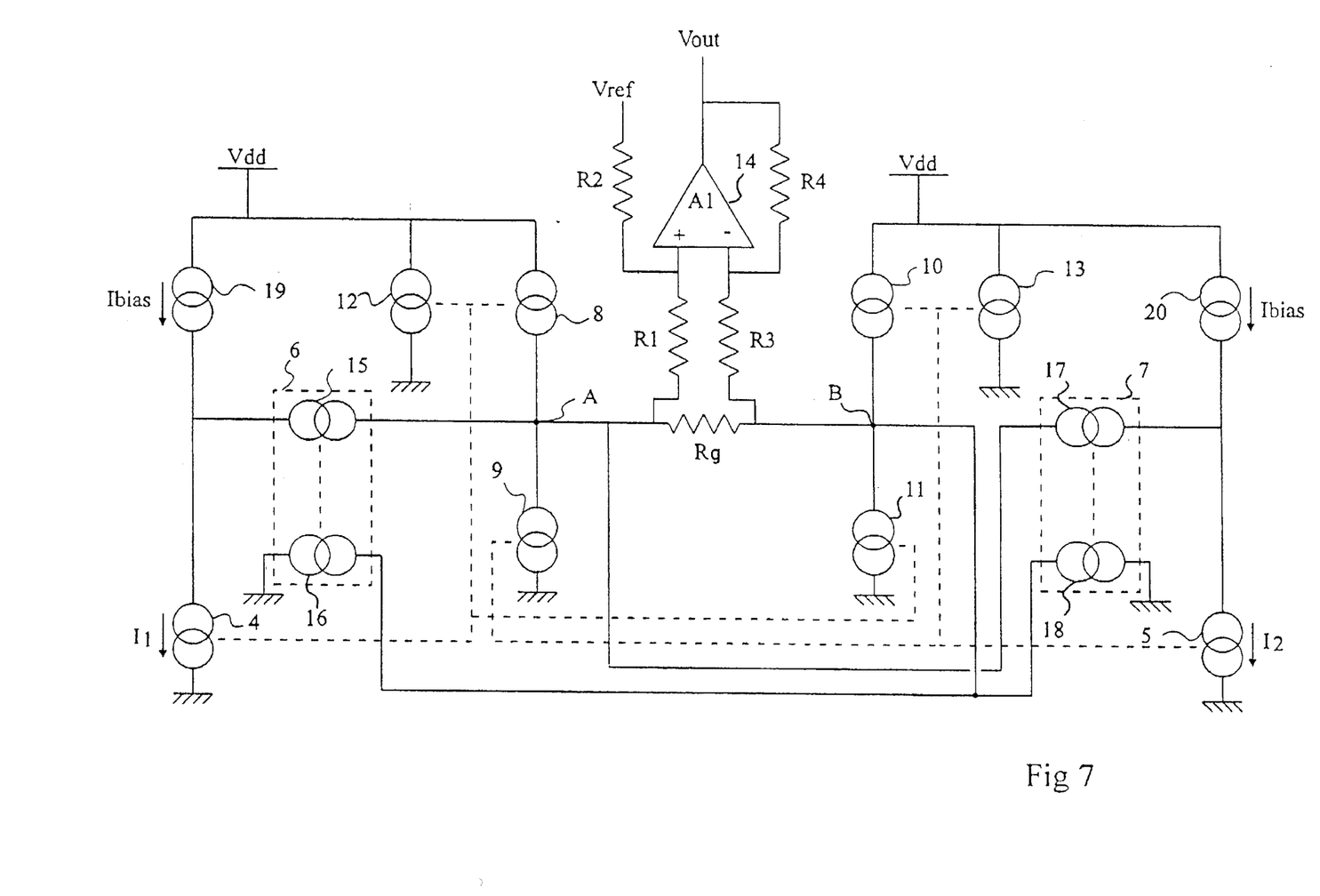
FIG. 7 is a block diagram of an embodiment of the current comparators of the device of FIG. 4.

FIG. 7 illustrates the compensation realized by the comparators 6, 7. The transistors M8, M9, M11, M12 constituting the auxiliary bridge around the resistor Rg are symbolized by the current sources 8, 9, 10, 11. The transistors M7, M13, M14, M15 and M10, M16, M17, M18 reproducing the currents I1 and I2 are symbolized by current sources 12, 13. The mirror transistors M5, M6 in which flow the currents I1 and I2 are symbolized by current sources 4, 5. The dotted lines symbolize the control links of the current sources implemented by the connections between the gates of the various transistors.

The comparators 6, 7 are respectively implemented by two mirror-connected current sources 15, 16 and 17, 18. The biasing current Ibias provided to each comparator 6, 7 is respectively symbolized by a current source 19, 20 between the supply voltage Vdd and the current source 4, 5 to which the comparator is associated. The inputs of sources 15, 17 are connected to the junction of sources 19, 4 and 20, 5. The outputs of the two sources 15, 17 are connected to the node A corresponding to one terminal of resistor Rg. The two mirror sources 16, 18 are connected between the node B, corresponding to the second terminal of resistor Rg, and ground.

In such a circuit, the difference between the biasing current Ibias and the current I1 or I2, if it is positive, is drawn from node B and sent to node A. Only the positive difference is taken into account. Indeed, if, for example, I1 is higher than Ibias, the difference Ibias-I1 is sent by source 15 to node A. This difference is also drawn by source 16 from node B. On the other hand, if I2 is higher than Ibias, the value Ibias-I2 is negative. This value cannot be drawn from node A as a negative current cannot be absorbed by the source 18 which is connected to ground. The same explanation applies to node B and to source 16 if I1 is higher than Ibias, that is if the direction of current I in load 1 is inverted.

Accordingly, the current in resistor Rg is always proportional to the current in the load I with a fixed ratio corresponding to the ratio between the gate widths of transistors M3, M5 and M4, M6. The functional circuit illustrated in FIG. 7 relative to comparators 6, 7 can easily be implemented by these skilled in the art.

Of course, the invention is liable to various variants and modifications that will appear to those skilled in the art. In particular, the invention applies to any load 1 arranged in the diagonal of a H-bridge operating in class AB. Additionally, each of the disclosed components can be replaced by one or a plurality of elements having the same function.

Having thus described at least one illustrative embodiment of the invention, various alterations, modifications and improvements will readily occur to these skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A current sense device for a load arranged in a diagonal of a H-bridge having two high-side MOS transistors and two low-side MOS transistors and operating in class AB, the current sense device comprising first mean for determining the current flowing in the load without influencing the current flowing in the load.

2. A current sense device according to claim 1, further comprising a current-voltage converter for converting the current measured by said first means into a voltage proportional to said current; and a sense amplifier receiving said voltage to determine the transconductance gain of a control amplifier of the four MOS transistors of the H-bridge.

3. A current sense device according to claim 2, further comprising second means for separating said voltage from the current in the two high-side MOS transistors of the H-bridge so that said voltage is linearly proportional to the current flowing in the load.

4. A current sense device according to claim 1, wherein said first means includes two current mirrors for reproducing the currents flowing in the two low-side MOS transistors of the H-bridge.

5. A current sense device according to claim 2, wherein said current-voltage converter includes an operational amplifier whose inputs are connected to the terminals of a resistor arranged in a diagonal of an auxiliary bridge comprising MOS transistors, the currents reproduced by the current mirrors constituting the control signals of said auxiliary bridge.

6. A current sense device according to claim 5, wherein said second means includes two current comparators, each current comparator receiving one of the currents, reproduced by one of the current mirrors, and a biasing current; each current comparator providing a current representing the difference between the biasing current and the respective current reproduced by the mirrors; the result of the comparison and its inverted value being reproduced at the terminals of the register of the auxiliary bridge.

7. A current sense device according to claim 4 wherein each of the current mirrors comprises a MOS transistor, whose source is grounded, whose gate is connected to the gate of one of the low-side transistors of the H-bridge, and whose drain constitutes one of the terminals of the transconductance control amplifier.

8. A device according to claim 5, wherein the value of the resistor of the current-voltage converter determines, through the sense amplifier, the transconductance gain of the control amplifier of the H-bridge.

9. A current sense device according to claim 1 wherein said load comprises a moving coil for positioning a read/write head of a hard disk.

10. A current sense device according to claim 3, wherein said current-voltage converter includes an operational amplifier whose inputs are connected to the terminals of a resistor arranged in a diagonal of an auxiliary bridge comprising MOS transistors, the currents reproduced by the current mirrors constituting the control signals of said auxiliary bridge.

11. A current sense device according to claim 2, wherein said first means includes two current mirrors for reproducing the currents flowing in the two low-side MOS transistors of the H-bridge.

12. A current sense device according to claim 11, wherein said current-voltage converter includes an operational amplifier whose inputs are connected to the terminals of a resistor arranged in a diagonal of an auxiliary bridge comprising MOS transistors, the currents reproduced by the current mirrors constituting the control signals of said auxiliary bridge.

13. A current sense device according to claim 3, wherein said first means includes two current mirrors for reproducing the currents flowing in the two low-side MOS transistors of the H-bridge.

14. A current sense device according to claim 13, wherein said current-voltage converter includes an operational amplifier whose inputs are connected to the terminals of a resistor arranged in a diagonal of an auxiliary bridge comprising MOS transistors, the currents reproduced by the current mirrors constituting the control signals of said auxiliary bridge.

15. A current sense device according to claim 14, wherein said second means includes two current comparators, each current comparator receiving one of the currents, reproduced by one of the current mirrors, and a biasing current; each current comparator providing a current representing the difference between the biasing current and the respective current reproduced by the mirrors; the result of the comparison and its inverted value being reproduced at the terminals of the register of the auxiliary bridge.

16. A method for sensing current in an H-bridge having two high-side transistors and two low-side transistors, the method comprising the steps of:

mirroring a current in the low side transistors without influencing current flowing in a diagonal of the H-bridge;

generating a voltage proportional to the mirrored current; and applying the voltage to a sense amplifier of the H-bridge.

17. The method of claim 16, wherein the mirroring step includes the steps of:

mirroring a first current in one of the low-side transistors; and mirroring a second current in another of the low-side transistors.

18. The method of claim 17, wherein the generating step includes the steps of:

applying the first mirrored current as an input to an auxiliary bridge;

applying the second mirrored current as an input to the auxiliary bridge; and outputting a voltage across a resistor connecting legs of the auxiliary bridge.

19. The method of claim 18, further comprising the step of generating a bias current; and wherein the first applying step includes the steps of:
comparing the first mirrored current to the bias current to produce a first difference current;
generating an inverse of the first difference current;
applying the first difference current and the inverse of the first difference current to the auxiliary bridge; and wherein the second applying step includes the steps of:
comparing the second mirrored current to the bias current to produce a second difference current;
generating an inverse of the second difference current;
applying the second difference current and the inverse of the second difference current to the auxiliary bridge.

20. An system for driving a load comprising:

two high-side transistors and two low-side transistors connected to the load in an H-bridge configuration;

a mirror circuit outputting a current proportional to a current in the low-side transistors, the mirror circuit being arranged so that it does not influence current flowing in a diagonal of the H-bridge;

a conversion circuit connected to the mirror circuit to output a voltage proportional to the current output by the mirror circuit; and a driver circuit connected to the conversion circuit for driving the high-side transistors and low-side transistors based upon the voltage and a target load current value.

21. The system of claim 20, wherein the load includes a moving coil for positioning a read/write head of a hard disk.

22. The system of claim 20, wherein the conversion circuit includes an auxilary bridge receiving the current output by the mirror circuit; and a resistor connecting legs of the auxilary bridge, wherein the voltage is determined across the resistor.

23. The system of claim 20, wherein the mirror circuit includes:

a first current mirror providing a current proportional to a current in one of the low-side transistors; and a second current mirror providing a current proportional to a current in another of the low-side transistors.

24. The system of claim 23, wherein the mirror circuit further includes:

a first comparator for comparing an output of the first current mirror to a reference current;

a second comparator for comparing an output of the second current mirror to the reference current;

an output circuit for outputting a current from the first comparator and a current from the second comparator.

* * * * *

UNITED STATES PATENT AND TRADEMARK OFFICE
CERTIFICATE OF CORRECTION

PATENT NO. : 5,644,484 Page 1 of 1
APPLICATION NO. : 08/501881
DATED : July 1, 1997
INVENTOR(S) : PakriSwami Elango It is certified that error appears in the above-identified patent and that said Letters Patent is hereby corrected as shown below:

Col. 6, line 59 should read:
mented by those skilled in the art.

Col. 7, line 1 should read:
improvements will readily occur to those skilled in the art.

Claim 1, col. 7, line 11 should read:
current sense device comprising first means for determining Claim 18, col. 8, line 47 should read:
auxiliary bridge;
    col. 8, line 49 should read:
auxiliary bridge; and
    col. 8, line 51 should read:
the auxiliary bridge.

Claim 22, col. 9, line 19 should read:
circuit includes an auxiliary bridge receiving the current
    col. 10, line 1 should read:
a resistor connecting legs of the auxiliary bridge, wherein Signed and Sealed this Fifth Day of August, 2008

JON W. DUDAS
*Director of the United States Patent and Trademark Office*